United States Patent
Ko et al.

(10) Patent No.: US 7,508,111 B2
(45) Date of Patent: Mar. 24, 2009

(54) BIAXIAL ACTUATORS WITH COMB ELECTRODES HAVING SEPARATED VERTICAL POSITIONS

(75) Inventors: Young-chul Ko, Gyeonggi-do (KR); Jin-ho Lee, Gyeonggi-do (KR); Jin-woo Cho, Gyeonggi-do (KR); Hyun-ku Jeong, Chungcheongbuk-do (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 469 days.

(21) Appl. No.: 11/248,169

(22) Filed: Oct. 13, 2005

(65) Prior Publication Data
US 2006/0082250 A1    Apr. 20, 2006

(30) Foreign Application Priority Data
Oct. 19, 2004    (KR) .................... 10-2004-0083537

(51) Int. Cl.
 *H02N 1/00* (2006.01)
 *G02B 26/08* (2006.01)
(52) U.S. Cl. .................. 310/309; 359/224; 359/225; 359/291
(58) Field of Classification Search ................ 310/309; 359/223–225, 290, 291
See application file for complete search history.

(56) References Cited

U.S. PATENT DOCUMENTS 5,959,760 A * 9/1999 Yamada et al. ............ 359/224
6,690,850 B1 * 2/2004 Greywall .................. 385/18
6,744,173 B2 * 6/2004 Behin et al. ............... 310/309
6,795,225 B2 * 9/2004 Tsuboi et al. .............. 359/224
7,185,994 B2 * 3/2007 Ko et al. ................... 359/872

(Continued)

FOREIGN PATENT DOCUMENTS

EP    1411024 A2    4/2004

(Continued)

OTHER PUBLICATIONS

International Search Report dated Jul. 2, 2008.

*Primary Examiner*—Karl I Tamai
(74) *Attorney, Agent, or Firm*—Buchanan Ingersoll & Rooney PC

(57) ABSTRACT

Provided are a biaxial actuator and a method of manufacturing the same. The biaxial actuator includes: a stage unit seesawing in a first direction; a first support unit supporting the stage unit; a stage unit driving unit including first driving comb electrodes outwardly extending from opposite sides of the stage unit in the first direction, and first fixed comb electrodes extending from the first support unit facing the first driving comb electrodes such that the first driving and fixed comb electrodes alternate with each other; a second support unit supporting the first support unit such that the first support unit seesaws in a second direction perpendicular to the first direction; and a first support unit driving unit including second driving comb electrodes installed at the first support unit, and second fixed comb electrodes corresponding to the second driving comb electrodes, wherein the first and second driving comb electrodes and the stage unit are formed at a first level, and the first and second fixed comb electrodes are formed at a second level lower than the first level such that the first and second fixed comb electrodes do not overlap with the first and second driving comb electrodes at a vertical plane.

24 Claims, 10 Drawing Sheets

U.S. PATENT DOCUMENTS

| | | | |
|---|---|---|---|
| 7,301,692 B2 * | 11/2007 | Ko et al. | 359/291 |
| 2002/0005976 A1 | 1/2002 | Behin et al. | |
| 2006/0082250 A1 * | 4/2006 | Ko et al. | 310/309 |

FOREIGN PATENT DOCUMENTS

| | | |
|---|---|---|
| EP | 1569023 A1 | 8/2005 |
| WO | 01/73935 A2 | 10/2001 |
| WO | 2004034126 A1 | 4/2004 |

* cited by examiner

BIAXIAL ACTUATORS WITH COMB ELECTRODES HAVING SEPARATED VERTICAL POSITIONS

BACKGROUND OF THE DISCLOSURE

This application claims the priority of Korean Patent Application No. 10-2004-0083537, filed on Oct. 19, 2004, in the Korean Intellectual Property Office, the disclosure of which is incorporated herein in its entirety by reference.

1. Field of the Disclosure

The disclosure relates to a biaxial micro-electro-mechanical system (MEMS) actuator and a method of manufacturing the same, and more particularly to a biaxial actuator for seesaw driving in two directions and a method of manufacturing the same.

2. Description of the Related Art

Optical scanners including biaxial actuators can be used for large displays. The driving speed of a biaxial actuator relates to the resolution of a display device, and the driving angle of the biaxial actuator relates to the screen size of the display device. That is, as the driving speed of a micro mirror increases, resolution is improved. Also, as the driving angle of the micro mirror increases, the screen size of the display device increases. Accordingly, in order to realize large display devices with high resolution, optical scanners including biaxial actuators need to operate at high speed and have a high driving angle.

However, since the driving speed and the driving angle of the micro mirror are in a trade-off relation, there is a limitation in increasing both the driving speed and the driving angle of the biaxial actuator.

Optical scanners used for display devices need to operate at high speed, that is, operate at a resonant frequency during horizontal scanning, but need to operate linearly, that is, operate at a non-resonant frequency during vertical scanning.

Conventional actuators designed for resonant driving are hard to operate at a non-resonant frequency.

SUMMARY OF THE DISCLOSURE

The present invention may provide a biaxial actuator capable of resonant driving during horizontal scanning and non-resonant linear driving during vertical scanning, and a method of manufacturing the biaxial actuator.

The present invention may also provide a biaxial actuator having a high driving force and a high driving angle, and a method of manufacturing the biaxial actuator.

The present invention may also provide a biaxial actuator, which can be manufactured easily, and a method of manufacturing the biaxial actuator.

According to an aspect of the present invention, there may be provided a biaxial actuator comprising: a stage unit seesawing in a first direction; a first support unit supporting the stage unit; a stage unit driving unit including first driving comb electrodes outwardly extending from opposite sides of the stage unit in the first direction, and first fixed comb electrodes extending from the first support unit facing the first driving comb electrodes such that the first driving and fixed comb electrodes alternate with each other; a second support unit supporting the first support unit such that the first support unit seesaws in a second direction perpendicular to the first direction; and a first support unit driving unit including second driving comb electrodes installed at the first support unit, and second fixed comb electrodes corresponding to the second driving comb electrodes, wherein the first and second driving comb electrodes and the stage unit are formed at a first level, and the first and second fixed comb electrodes are formed at a second level lower than the first level such that the first and second fixed comb electrodes do not overlap with the first and second driving comb electrodes at a vertical plane.

The stage unit may comprise: a connecting part of which the first driving comb electrodes are formed at an outer surface; and a stage formed at an inner surface of the connecting part.

The stage may be a circular plate.

The connecting part may be an oval band having the inner surface to which the stage is connected.

The first support unit may comprise: a pair of first torsion springs extending from opposite sides of the stage unit in the second direction; and a rectangular moving frame including a pair of first portions parallel to each other and to which the first torsion springs are connected, and a pair of second portions parallel to each other and extending in the second direction, wherein the rectangular moving frame is made up of a first silicon layer to which the first torsion springs are connected, a second silicon layer to which the first fixed comb electrode is connected, and an insulation layer between the first silicon layer and the second silicon layer.

The second support unit may comprise: a pair of second torsion springs extending from the second portions of the first support unit in the first direction; and a rectangular fixed frame including a pair of second portions parallel to each other to which the second torsion springs are connected, and a pair of first portions parallel to each other extending in the first direction, wherein each of the fixed frame and the second torsion springs is made up of the first silicon layer, the second silicon layer, and the insulation layer.

The first support unit driving unit may comprise first extending members extending from the first level of the moving frame parallel to the second torsion springs, wherein the second driving comb electrodes extend from the first extending members towards the first portions of the second support unit that face the first extending members, wherein the second fixed comb electrodes extend from second extending members that extend from the second silicon layer of the second support unit to correspond to the first extending members.

The first and second driving comb electrodes may be electrically connected to each other via the first silicon layer of the second torsion springs, the second silicon layer of the fixed frame may have four electrically isolated portions such that voltage is separately applied to drive the stage unit in the first direction and in the second direction, and the second silicon layer of the moving frame may have two electrically isolated portions such that voltage is separately applied from the second silicon layer of the second torsion springs.

The biaxial actuator may further comprise: third driving comb electrodes formed at an inner surface of the connecting part; a base formed under the first support unit; and third fixed comb electrodes formed on the base to correspond to the third driving comb electrodes.

The biaxial actuator may further comprise a conductive layer formed on the base to electrically connect the corresponding first fixed comb electrodes and third fixed comb electrodes.

The stage unit, the stage unit driving unit, the first support unit, the second support unit, and the first support unit driving unit may be manufactured as one silicon-on-insulator (SOI) substrate.

The first torsion springs may be meander springs.

According to another aspect of the present invention, there may be provided a biaxial actuator comprising: a stage unit seesawing in a first direction; a first support unit supporting the stage unit; a stage unit driving unit including first driving comb electrodes outwardly extending from opposite sides of the stage unit in the first direction, and first fixed comb electrodes extending from the first support unit facing the first driving comb electrodes such that the first driving and fixed comb electrodes alternate with each other; a second support unit supporting the first support unit such that the first support unit seesaws in a second direction perpendicular to the first direction; and a first support unit driving unit including second driving comb electrodes installed at the first support unit, and second fixed comb electrodes corresponding to the second driving comb electrodes, wherein the first and second driving comb electrodes and the stage unit are formed at a first level, the first and second fixed comb electrodes are formed at a second level lower than the first level and at a third level higher than the first level such that the first and second fixed comb electrodes do not overlap with the first and second driving comb electrodes at a vertical plane.

According to still another aspect of the present invention, there may be provided a method of manufacturing a biaxial actuator comprising: (a) preparing a first substrate in which a first silicon layer, an insulation layer, and a second silicon layer are sequentially stacked, and etching the second silicon layer to form a rectangular moving frame portion, first fixed comb electrodes inwardly extending from opposite sides of the moving frame in a first direction, a rectangular fixed frame portion surrounding the moving frame portion, a second torsion spring portion connecting between the moving frame portion and the fixed frame portion in the first direction, and second fixed comb electrodes extending from a first portion of the second silicon layer of the fixed frame portion, parallel to the second torsion spring portion, towards the second torsion spring portion; (b) respectively forming electrode pads on central portions of one opposite sides and the other opposite sides of a glass substrate; (c) etching inner areas of the fixed frame portion on the glass substrate; (d) bonding the second silicon layer of the first substrate on the glass substrate; (e) forming an electrode pad in an area corresponding to the fixed frame portion on the first silicon layer; (f) etching the first silicon layer to form a stage unit, first driving comb electrodes formed at an outer surface of the stage unit to alternate with the first fixed comb electrodes, the moving frame portion, first torsion springs connecting the moving frame portion and the stage unit in a second direction perpendicular to the first direction, the fixed frame portion, the second torsion spring portion, and second driving comb electrodes extending from an extending member extending from the first silicon layer of the moving frame parallel to the second torsion spring portion to alternate with the second fixed comb electrodes; and (g) etching an exposed insulation layer.

According to yet another aspect of the present invention, there may be provided a method of manufacturing a biaxial actuator comprising: (a) preparing a first substrate in which a first silicon layer, an insulation layer, and a second silicon layer are sequentially stacked, and etching the second silicon layer to form a rectangular moving frame portion, first fixed comb electrodes inwardly extending from opposite sides of the moving frame in a first direction, a rectangular fixed frame portion surrounding the moving frame portion, a second torsion spring portion connecting between the moving frame portion and the fixed frame portion in the first direction, second fixed comb electrodes extending from a first portion of the second silicon layer of the fixed frame portion, parallel to the second torsion spring portion, towards the second torsion spring portion, and third fixed comb electrodes formed inside the moving frame and extending in the first direction; (b) respectively forming electrode pads on central portions of one opposite sides and the other opposite sides of a glass substrate, and forming a conductive layer connecting the first fixed comb electrodes and the third fixed comb electrodes; (c) etching an upper portion between the fixed frame portion and the moving frame portion in the glass substrate such that a lower portion of the fixed frame portion and the moving frame portion are connected; (d) bonding the second silicon layer of the first substrate on the glass substrate; (e) grinding a lower portion of the glass substrate by CMP to separate a portion attached to the fixed frame portion from a portion attached to the moving frame portion; (f) forming an electrode pad in an area corresponding to the fixed frame portion on the first silicon layer; (g) etching the first silicon layer to form a stage unit including a stage and a connecting part of which the stage is formed at an inner surface, first driving comb electrodes formed at an outer surface of the connecting part to alternate with the first fixed comb electrodes, third driving comb electrodes formed at an area inside the connecting part to alternate with the third fixed comb electrodes, the moving frame portion, first torsion springs connecting the moving frame portion and the connecting part in a second direction perpendicular to the first direction, the fixed frame portion, the second torsion spring portion, and second driving comb electrodes extending from an extending member extending from the first silicon layer of the moving frame parallel to the second torsion spring portion to alternate with the second fixed comb electrodes; and (h) etching an exposed insulation layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
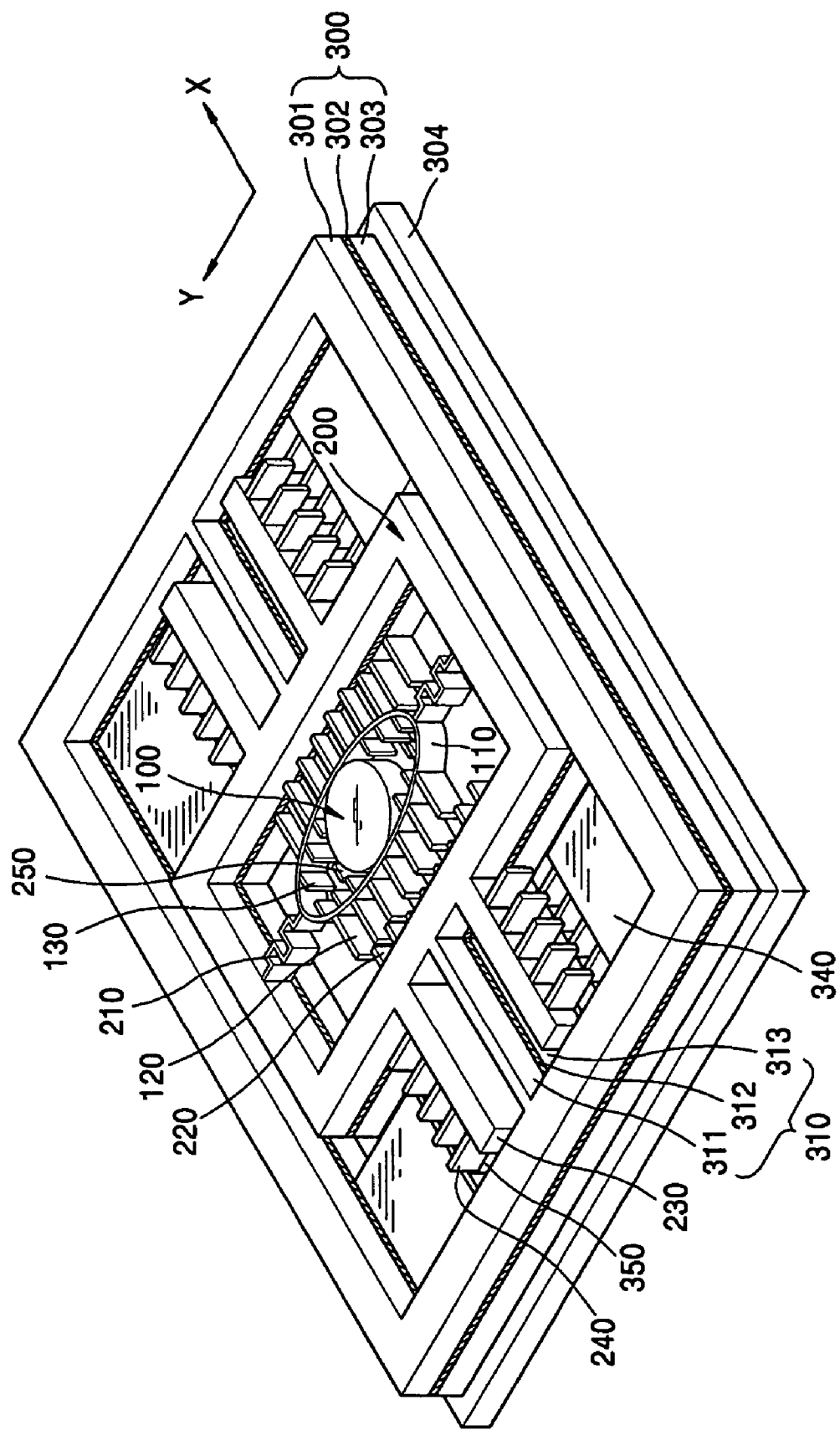
FIG. 1 is a schematic perspective view of a biaxial actuator according to a first embodiment of the present invention.

The present invention will now be described more fully with reference to the accompanying drawings, in which preferred embodiments of the invention are shown. The sizes of elements shown in the drawings may be exaggerated, if needed, or sometime the elements may be omitted for a bettering understanding of the present invention. However, such ways of description do not limit the scope of the technical concept of the present invention.

Figure 2:
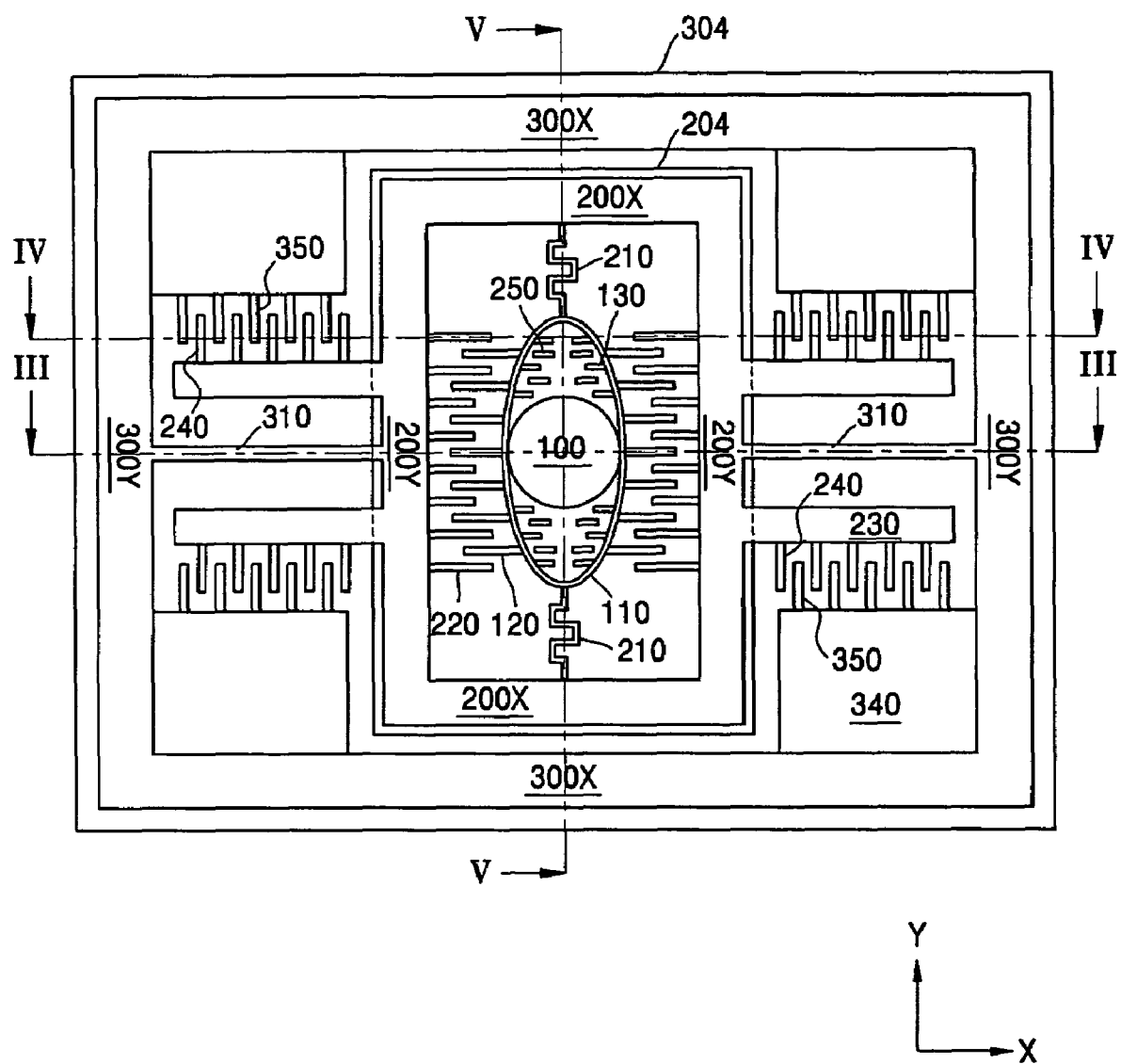
FIG. 2 is a plan view of the biaxial actuator of FIG. 1.
Figure 3:
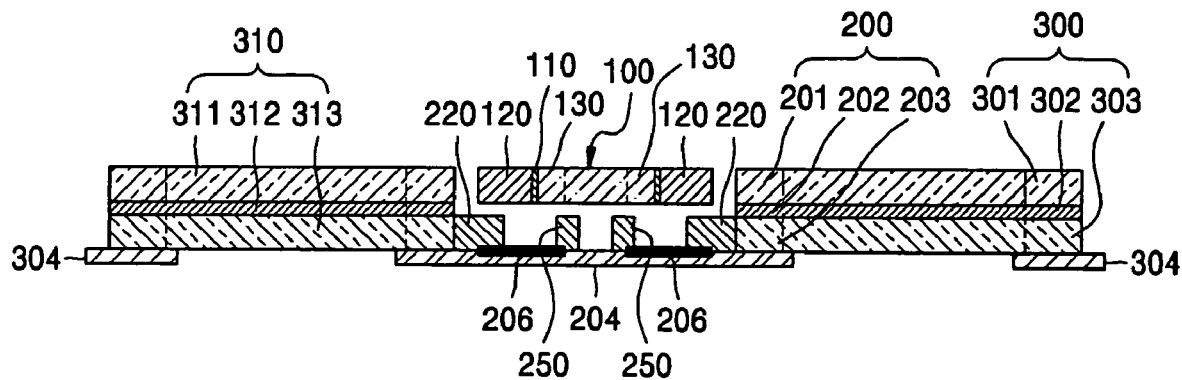
FIG. 3 is a sectional view of the biaxial actuator taken along line III-III of FIG. 2.
Figure 4:
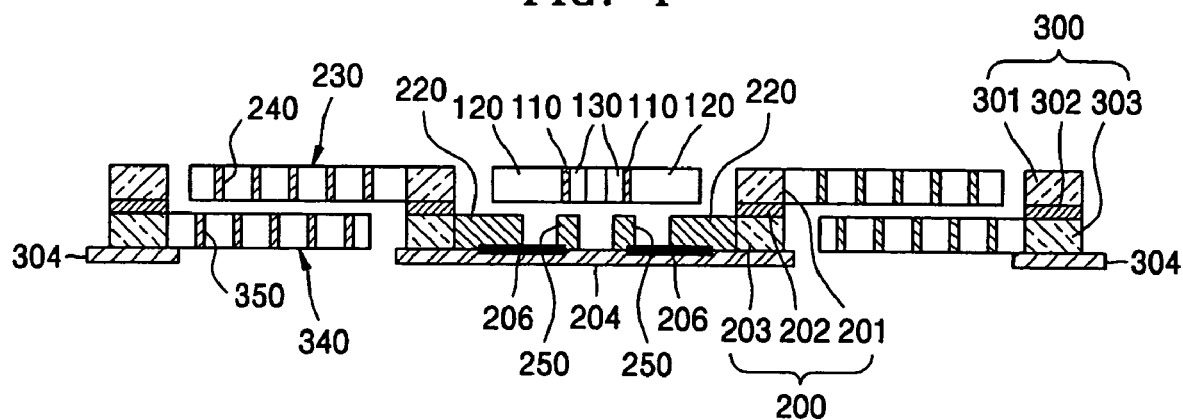
FIG. 4 is a sectional view of the biaxial actuator taken along line IV-IV of FIG. 2.
Figure 5:
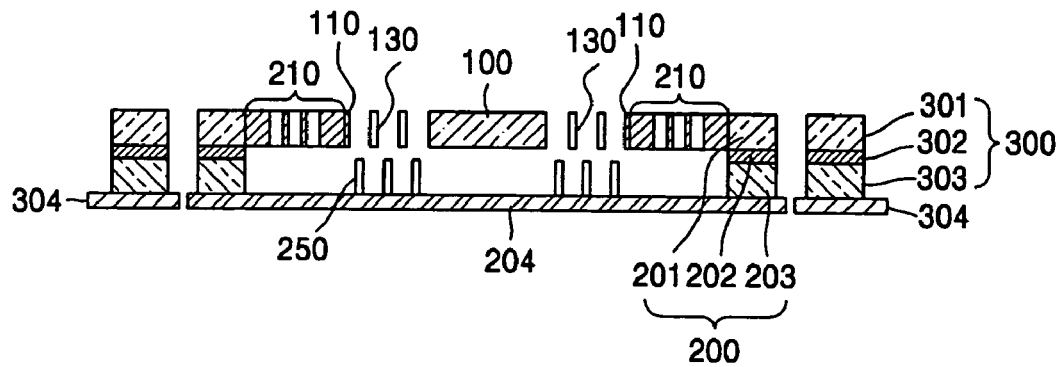
FIG. 5 is a sectional view of the biaxial actuator taken along line V-V of FIG. 2.

FIG. 1 is a schematic perspective view of a biaxial actuator according to a first embodiment of the present invention. FIG. 2 is a plan view of the biaxial actuator of FIG. 1. FIGS. 3 through 5 are sectional views respectively taken along lines III-III, IVIV, and V-V of FIG. 2.

Referring to FIGS. 1 and 2, a stage unit may include a stage 100 that has a mirror (not shown) formed on a surface thereof, and a connecting part 110. The stage 100 may be a circular plate with a minimum area for light reflection. The connecting part 110 may be an oval band, and the stage 100 may be connected to an inner circumferential surface in a direction of the shorter diameter of the connecting part 110. The reason why such a circular stage 100 may be used is to reduce the load of the stage 100 and increase a driving force.

The connecting part 110 may be supported by a first support unit including first torsion springs 210 and a rectangular moving frame 200 such that the connecting part 110 can seesaw in a first direction (X-direction). The first torsion springs 210 may be meander springs.

The first support unit may be supported by a second support unit including second torsion springs 310 and a rectangular fixed frame 300 such that the first support unit can seesaw in a second direction (Y-direction) perpendicular to the first direction. Accordingly, the stage 100 supported by the first support unit and the second support unit may move in two directions.

In detail, the stage 100 may be connected to the rectangular moving frame 200 via the two first torsion springs 210 that may be formed in the second direction. Accordingly, the stage 100 may be supported to seesaw around the first torsion springs 210. Further, since the first torsion springs 210 are meander springs, the length of second portions 200y of the moving frame 200, which will be explained later, may be reduced and a driving angle at a non-resonant frequency may increase.

The first torsion springs 210 may be respectively connected to centers of first portions 200x of the rectangular moving frame 200. The second torsion springs 310 may be respectively connected to centers of the second portions 200y of the rectangular moving frame 200. The rectangular moving frame 200 may include the two first portions 200x that are parallel to each other and extend in the first direction, and the two second portions 200y that may be parallel to each other and extend in the second direction. The rectangular fixed frame 300 may surround the rectangular moving frame 200. The rectangular fixed frame 300 may include first portions 300x that may extend in the first direction, and second portions 300y that may extend in the second direction. The second torsion springs 310 connected to the centers of the second portions 200y may also be connected to centers of the second portions 300y of the rectangular fixed frame 300. The second torsion springs 310 may extend in the first direction. Accordingly, the moving frame 200 may be supported to seesaw around the second torsion springs 310.

As shown in FIGS. 1 and 3, the moving frame 200, the fixed frame 300, and the second torsion springs 310 may be a multi-tiered structure having multiple layers 201, 202, and 203, 301, 302, and 303, and 311, 312, and 313. The multi-tiered structure may be a silicon-on-insulator (SOI) substrate including highly doped first silicon layers 201, 301, and 311, second silicon layers 203, 303, and 313, and SiO₂ insulation layers 202, 302, and 312 between the first silicon layers and the second silicon layers. Reference numerals 204 and 304 denote a first base and a second base, respectively, which may be insulation substrates, such as glass substrates. The multi-tiered structure will be understood through an explanation about a method of manufacturing an actuator according to the present invention.

A stage unit driving unit causing the stage 100 to seesaw, as shown in FIGS. 3 through 5, may include first driving comb electrodes 120 formed outside the connecting part 110 and the first fixed comb electrodes 220 extending from the second silicon layer 202 of the moving frame 200 to alternate with the first driving comb electrodes 120, and third driving comb electrodes 130 formed inside the connecting part 110 and third fixed comb electrodes 250 being formed on the first base 204 to correspond to the third driving comb electrodes 130. Since the fixed comb electrodes may be vertically formed and the corresponding comb electrodes may extend from different level of silicon layers from each other, the comb electrodes may be easily manufactured as it will be described later, and electrical paths may be easily formed.

In the meantime, a first support unit driving unit that causes the first support unit to seesaw may be interposed between the moving frame 200 and the fixed frame 300. As shown in FIGS. 1 and 2, first extending members 230 may extend from the first silicon layer 201 of the second portions 200y of the moving frame 200 toward the second portions 300y of the fixed frame 300 that is connected to the second portions 200y by the second torsion springs 310. Second driving comb electrodes 240 may be formed at a side surface of the first extending members 230. Second extending members 340 may extend from the second silicon layer 303 of the fixed frame 300 to correspond to the first extending members 230. Second fixed comb electrodes 350 may be formed on a side surface of the second extending members 340 facing the first extending members 230 to correspond to the second driving comb electrodes 240. The comb electrodes 240 and 350 alternate with each other as shown in FIG. 4, and extend from silicon layers of different levels.

Figure 6:
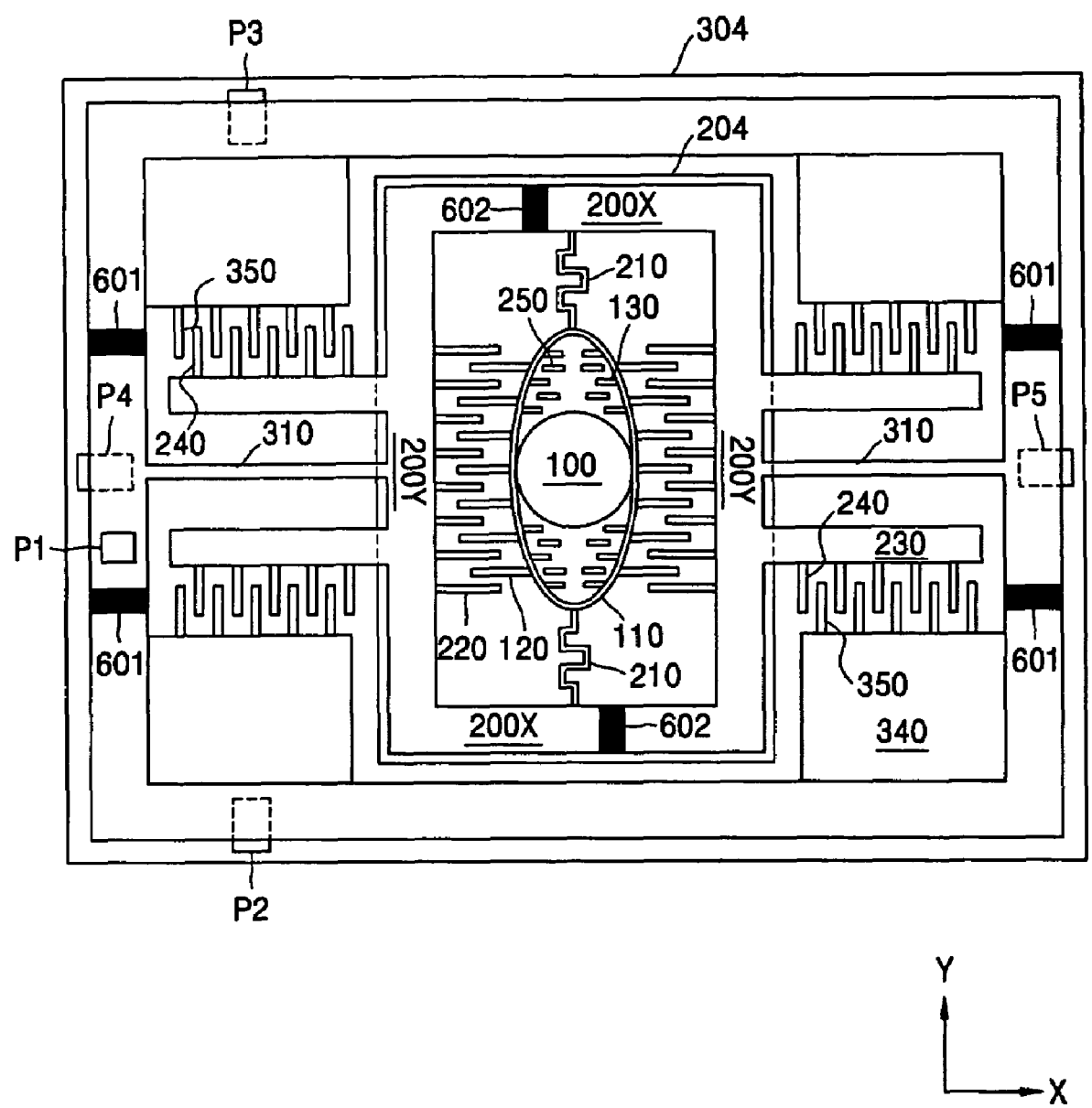
FIG. 6 is a plan view for explaining an electrical path of the biaxial actuator of FIG. 2.

In the present embodiment, at least three electrical paths may be needed for the motion of the stage 100, and three electrical paths may be needed for the motion of the moving frame 200. Here, when the ground is maintained at the same electric potential, five electrical paths may be needed. FIG. 6 is a plan view of the actuator of FIG. 2 for explaining an electrical path of the actuator. In FIG. 6, black portions 601 and 602 are electrically isolated portions, and reference numerals P1, P2, P3, P4, and P5 denote electrode pads for wiring with an external circuit. The electrode pads P2 through P5 are disposed between two electrically isolated portions 601.

Referring to FIG. 6, the first electrode pad P1 may be disposed on the second portions 300y (at the left side on the drawing), and electrically connected to the first through third driving comb electrodes 120, 130, and 240 via the first silicon layer 311 of the second torsion springs 310 and the first torsion spring 210. Here, the first pad P1 may act as a virtual ground. The second and third pads P2 and P3 may be electrically connected to the second silicon layer 303 of the first portions 300x of the fixed frame 300 that may be electrically isolated by the electrically isolated portions 601. Accordingly, an electrical circuit for producing an electrostatic force may be formed between the second fixed comb electrodes 350 and the second driving comb electrodes 240. Meanwhile, the fourth pad P4 and the fifth pad P5 are electrically connected between the second silicon layer 303 of the second portions 300y of the fixed frame 300 and the second silicon layer 313 of the second torsion springs 310. The fourth pad P4 and the fifth pad P5 may be electrically connected to the moving frame 200 via the second silicon layer 313 of the second torsion springs 310. The second silicon layers 203 of the two second portions 200y of the moving frame 200 to which the fourth and fifth pads P4 and P5 are connected may be electrically separated by the electrically isolated portions 602. The fourth and fifth pads P4 and P5 may be connected to the fixed comb electrodes 220 via the second silicon layer 313 of the second torsion springs 310, and the third fixed comb electrodes 250, as shown in FIG. 4, may be electrically connected to the first fixed comb electrodes 220 by a conductive layer 206 formed on the first base 204.

The operation of the biaxial actuator according to the present embodiment will now be explained in detail.

First, if a predetermined voltage is applied to the electrode pad P5 when the electrode pad P1 is at a ground voltage, the stage 100 may seesaw in a positive x-direction due to an electrostatic force between the first and third fixed comb electrodes 220 and 250 and the first and third driving comb electrodes 120 and 130. In contrast, if the predetermined voltage is applied to the electrode pad P4, the stage may seesaw 100 in a negative x-direction.

Further, if a predetermined voltage is applied to the electrode pad P2, the stage 100 is driven in a negative y-direction due to an electrostatic force between the second driving comb electrodes 240 and the second fixed comb electrodes 350. If the predetermined voltage is applied to the electrode P3, the stage 100 is driven in a positive y-direction. Accordingly, the stage 100 can be driven in two directions.

Figure 7:
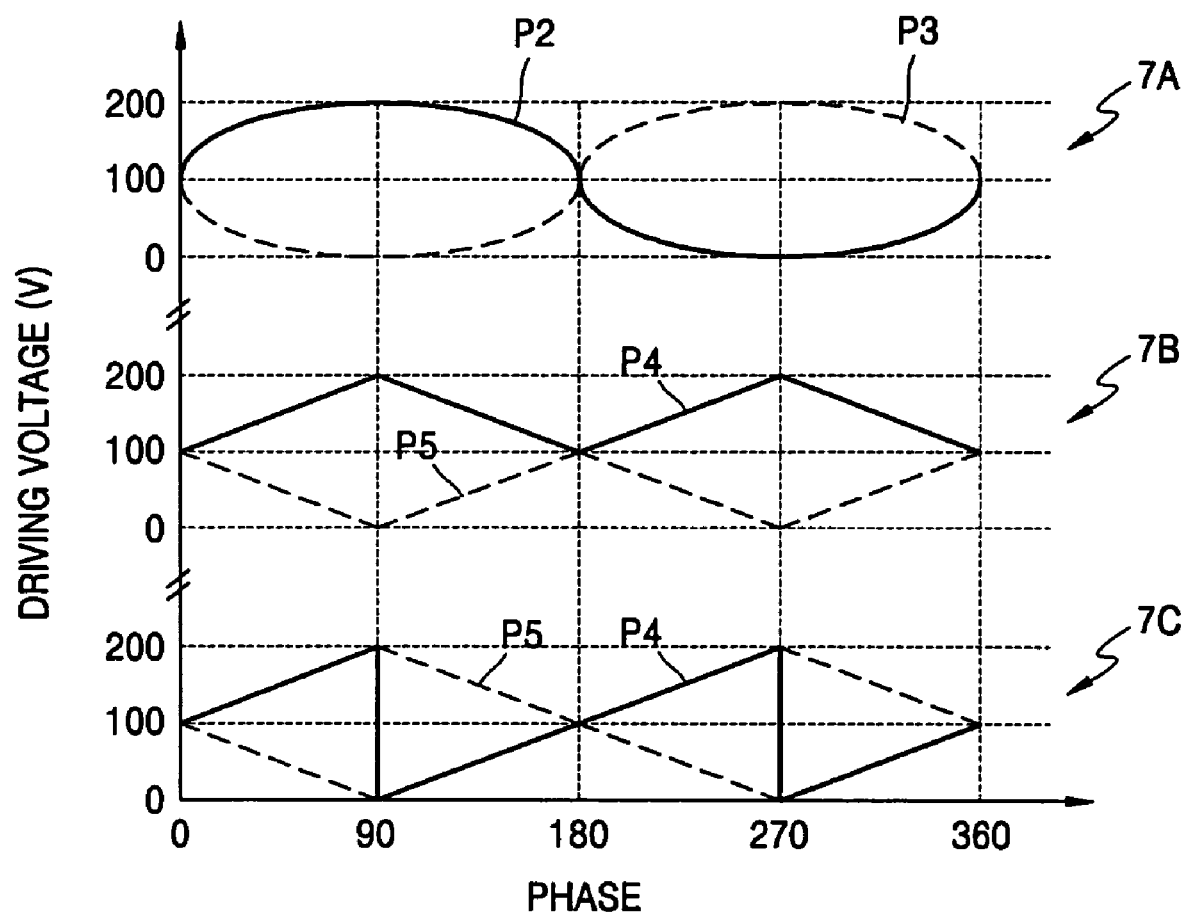
FIG. 7 is a timing diagram obtained when a voltage is applied to the biaxial actuator according to the first embodiment of the present invention.

FIG. 7 is a timing diagram when a voltage is applied to the biaxial actuator of the present invention.

Referring to FIG. 7, a sine wave pulse voltage with a 180-degree phase shift was applied to the electrode pads P2 and P3 for a horizontal scanning (see FIG. 7A). A triangular wave voltage with a 180-degree phase shift was applied to the electrode pads P4 and P5 for a vertical scanning in two directions (see FIG. 7B). A step pulse was applied to the electrode pads P4 and P5 in case of vertical scanning in one direction (see FIG. 7C). Here, a frequency of 22.5 kHz was used for the horizontal scanning, and a frequency of 60 Hz was used for the vertical scanning to perform a non-resonant linear driving. The second torsion springs 310 are designed such that a resonant frequency is approximately 1 kHz or more for the linear driving of the vertical scanning. According to results obtained using the ANSYS program, a driving angle was 8° or more when a driving frequency was 22.5 kHz in the horizontal scanning, and a resonant frequency was 1200 Hz in the vertical scanning. A driving angle was 4.5 to 5.0° when the driving frequency was 60 Hz in the vertical scanning.

Figure 8:
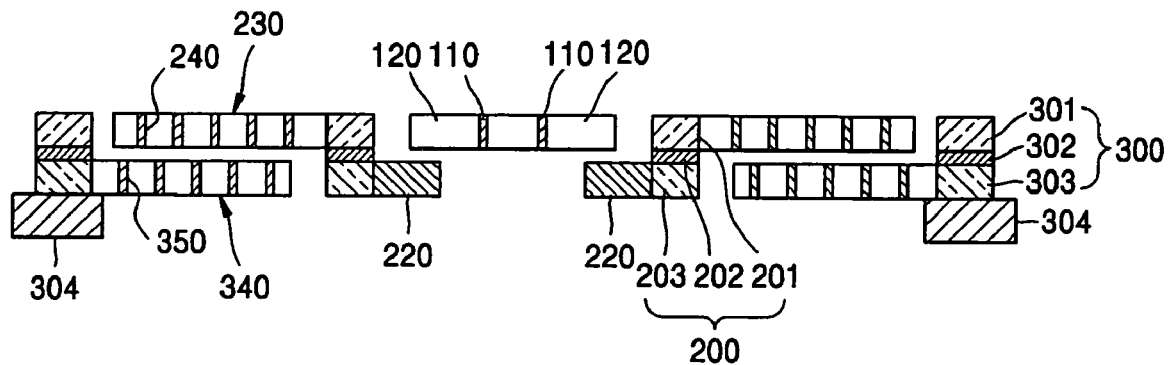
FIG. 8 is a sectional view of a biaxial actuator according to a second embodiment of the present invention.

FIG. 8 is a sectional view of a biaxial actuator according to a second embodiment of the present invention. The actuator may be structured such that the third driving comb electrodes 130, the third fixed comb electrodes 250, the first base 204, and the conductive layer 206 that electrically connects between the first fixed comb electrodes 220 and the third fixed comb electrodes 250 are removed from the actuator shown in FIG. 4.

Figure 9:
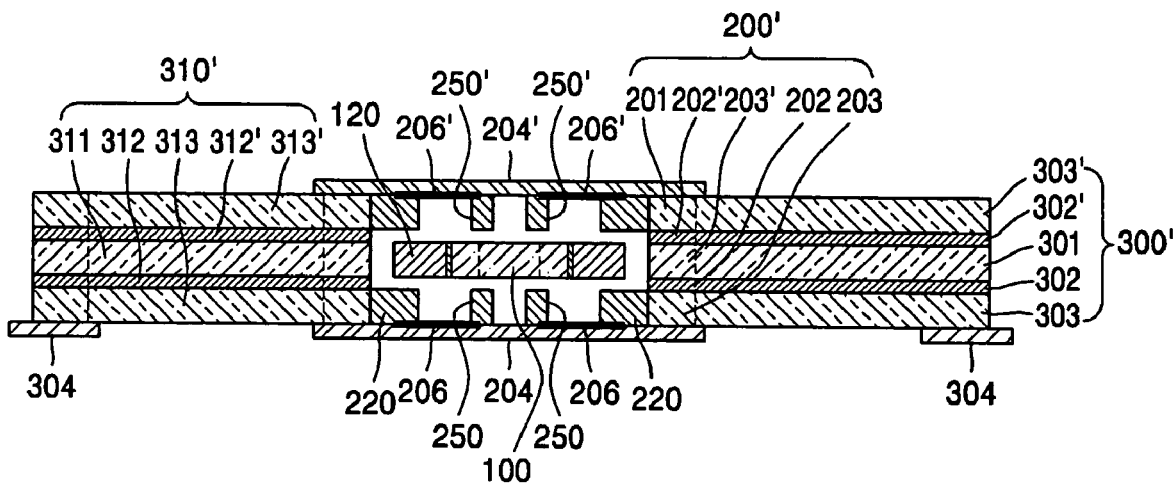
FIGS. 9 and 10 are schematic sectional views of a biaxial actuator according to a third embodiment of the present invention.
Figure 10:
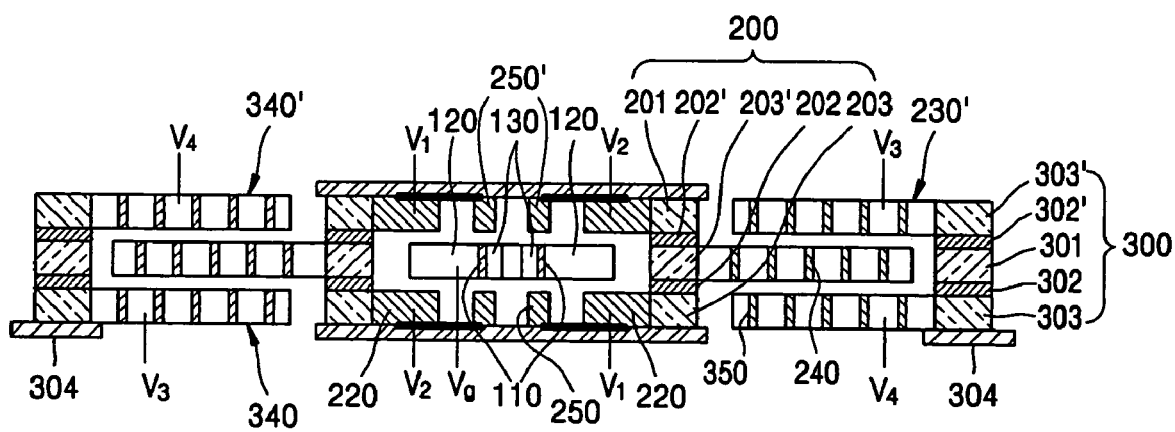

An actuator according to a third another embodiment of the present invention shown in FIGS. 9 and 10 further includes a driving unit that is disposed on a stage unit and drives the stage in two directions.

FIGS. 9 and 10 are schematic sectional views of the actuator according to a third embodiment of the present invention. The same elements as those in the first embodiment may be given the same reference numerals, and a detailed explanation thereof will not be given.

Referring to FIGS. 2, 9, and 10, on the basis of a first level on which a stage unit and driving comb electrodes are formed, the same structure of the second level of the first embodiment may be formed on the first level. That is, a moving frame 200', a fixed frame 300', and second torsion springs 310' are made of a multi-tiered structure having multiple layers 201, 202, 203, 202', and 203', 301, 302, 303, 302', and 303', and 311, 312, 313, 312', and 313'. The multi-tiered structure may be an SOI substrate having highly doped first silicon layers 201, 301, and 311, second silicon layers 203, 303, and 313, third silicon layers 203', 303', and 313', and first insulation layers 202, 302, and 312 and second insulation layers 202', 302', and 312' between the silicon layers. Reference numerals 204, 304, and 204' respectively denote first through third bases, which may be insulation substrates, such as glass substrates.

First through third fixed comb electrodes 220', 350', and 250', second extending members 340' are formed at a third level over the first level to respectively correspond to first through third fixed comb electrodes 220, 350, and 250, second extending members 340 formed at the second level under the first level. A conductive layer 206' is formed on the third level to correspond to a conductive layer 206.

The actuator of the present embodiment, as shown in FIG. 10, is driven in two directions by applying a ground voltage Vg to the driving comb electrodes and voltages V1 through V4 to electrodes that are formed on the second and third levels to be point-symmetric about the stage 100. Since voltage is simultaneously applied to the fixed electrodes that are diagonally formed, the actuator of the third embodiment has a higher driving force than the actuator of the first embodiment, and can be driven more stably.

A method of manufacturing an actuator according to a fourth embodiment of the present invention will now be explained in steps. In the present embodiment, a method of manufacturing the actuator of the first embodiment will be exemplarily explained below. Through the description of the manufacturing method, the detailed structure of the actuator of the first embodiment will be more clearly understood. The constituent elements shown in FIGS. 1 through 6 are cited with reference numerals, if necessary.

1. Manufacture of Base Substrate

Figure 11A:
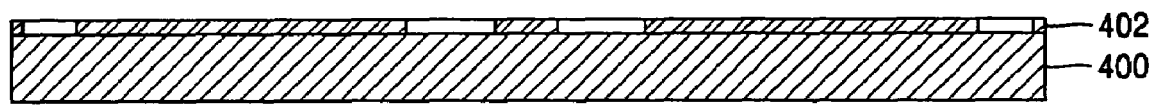
FIGS. 11A through 11E are sectional views illustrating steps of manufacturing a base substrate.

Referring to FIG. 11A, after a Pyrex glass 400 with a thickness of 400 μm is prepared, a photoresist 402 may be patterned on the glass 400 to expose portions corresponding to electrode pads P4 and P5 and a conductive layer 206.

Although not shown, predetermined portions corresponding to electrode pads P2 and P3 may also be exposed.

Figure 11B:

Referring to FIG. 11B, the portions exposed by the photoresist 402 may be etched to a depth of approximately 2000 Å, and then, the photoresist 402 may be removed.

Figure 11C:
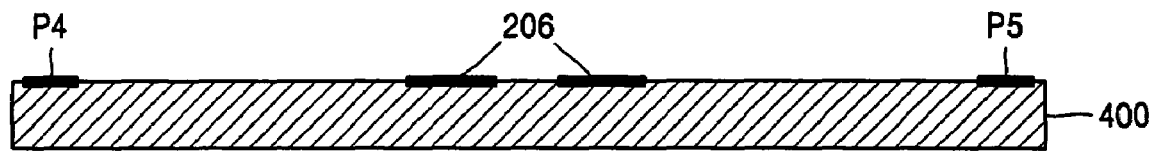

Referring to FIG. 11C, an Au/Cr film may be deposited on the glass 400 to a thickness of 4000/200 Å and then may be patterned to form the electrode pads P2 through P5 and the conductive layer 206 (for the electrode pads P2 and P3, see FIG. 6).

Figure 11D:
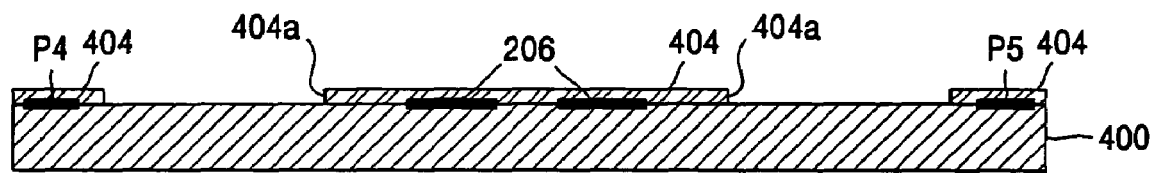

Referring to FIG. 11D, a dry film resist (DFR) film may be coated on the glass 400 to cover electrodes, and then, may be patterned. An opening portion 404a corresponds to an area between a fixed frame 300 and a moving frame 200 of an actuator.

Figure 11E:
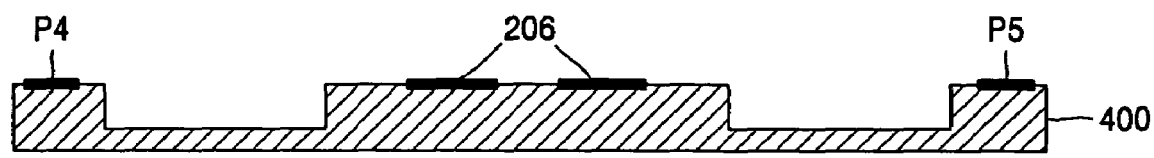

Referring to FIG. 11E, exposed portions of the Pyrex glass 400 may be etched by sand blasting, and the DFR film 400 may be removed to complete a glass base substrate 400. Here, the portions subjected to sand blasting may be partially etched such that the glass base substrate 400 may be integrally formed.

2. Manufacture of Lower Part of Main Body Structure

Figure 12A:
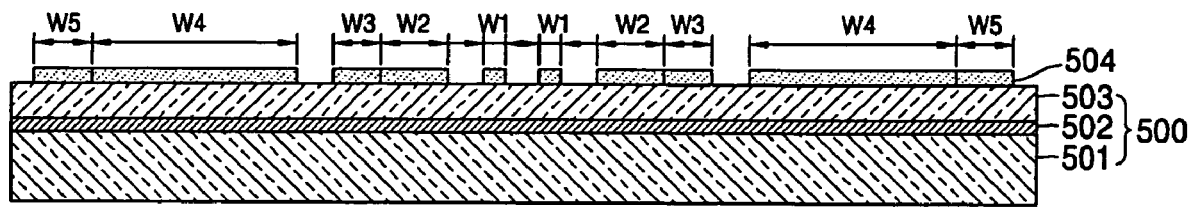
FIGS. 12A through 12C are sectional views illustrating steps of manufacturing a lower part of a main body structure.

Referring to FIG. 12A, as an upper structure material, a silicon-on-insulator (SOI) substrate 500 in which an $SiO_2$ insulation layer 502 with a thickness 1 to 2 μm may be formed as an etch stop layer between a first silicon layer 501 and a second silicon layer 503 may be prepared. A photoresist mask 504 having a predetermined shape may be formed on the second silicon layer 503. Here, portions covered by the mask 504 may be a third fixed comb electrode portion W1, a first fixed comb electrode portion W2, a moving frame portion W3, a second extending member portion W4, a fixed frame portion W5, and a second fixed comb electrode portion (not shown) extending from the fixed frame portion W5.

Figure 12B:
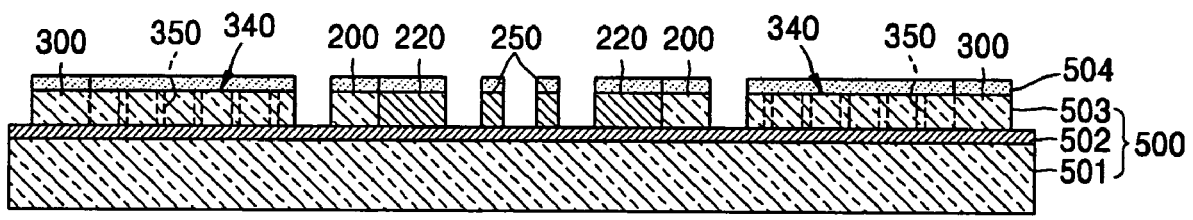

Referring to FIG. 12B, portions on the second silicon layer 503, which are not covered by the mask 504, may be etched in an Inductively Coupled Plasma Reactive Ion Etching (ICP-RIE) method to expose the insulation layer 502 through exposed areas of the mask 504. After etching is completed, the mask 504 may be removed by stripping.

Figure 12C:
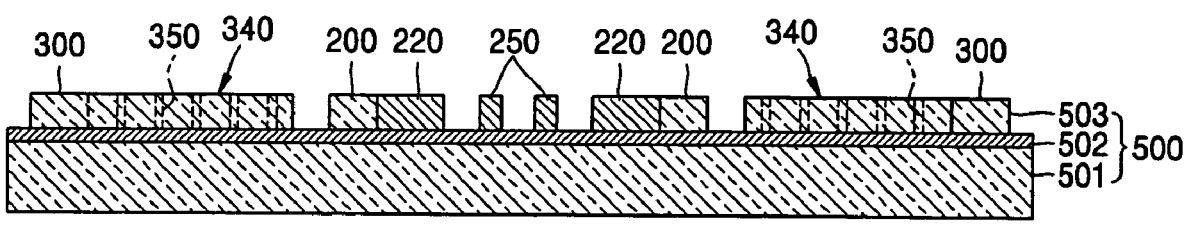

Referring to FIG. 12C, third fixed comb electrodes 250, first fixed comb electrodes 220, the moving frame 200, second extending members 340, and a fixed frame 300 may be formed on the insulation layer 502, and second fixed comb electrodes 350 extends from the fixed frame 340.

Figure 13A:
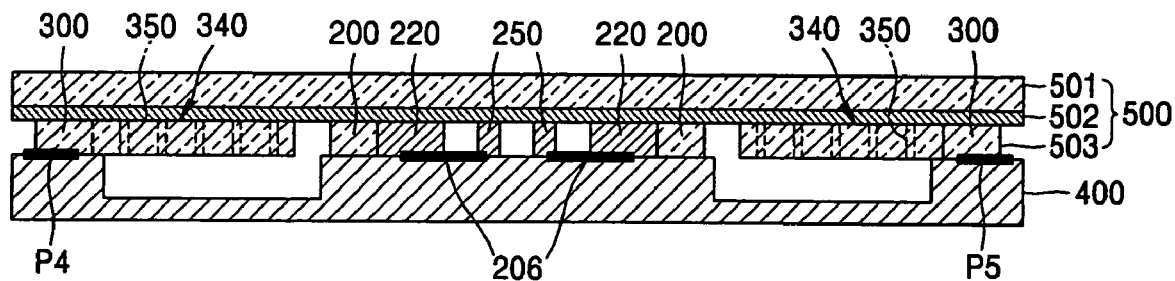
FIGS. 13A through 13F are sectional views illustrating steps of manufacturing an upper part of the main body structure when the lower structure and the main body structure are combined.

3. Bonding Between Base Substrate and Lower Part of Main Body Structure and Manufacture of Upper Part of Main Body Structure Referring to FIG. 13A, the substrate 500 from which the second silicon layer 503 is etched may be bonded to the glass base substrate 400 obtained through the above-described process. An anodic bonding may be used herein and the second silicon layer 503 contacts the glass base substrate 400. Here, a portion of the electrode pads P2 through P5 may be exposed from the fixed frame 300. Next, a top surface of the first silicon layer 501 may be grinded by a chemical mechanical polishing (CMP) method to a thickness of approximately 70 μm.

Figure 13B:
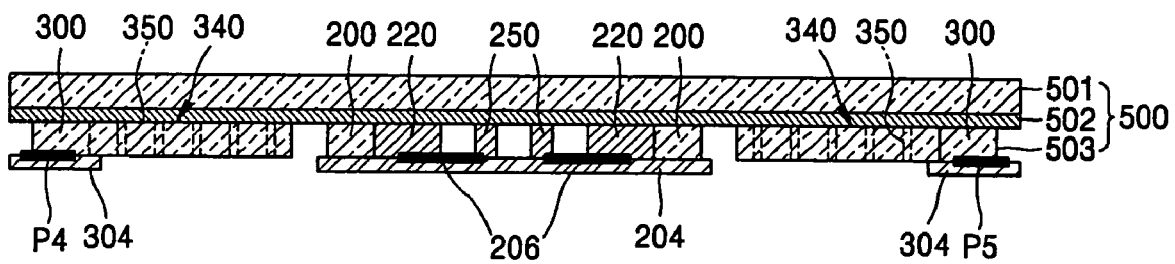

Referring to FIG. 13B, the glass substrate 400 may be grinded by CMP to separately form an inner glass substrate (i.e., a first base 204) and an outer glass substrate (i.e., a second base 304).

Figure 13C:
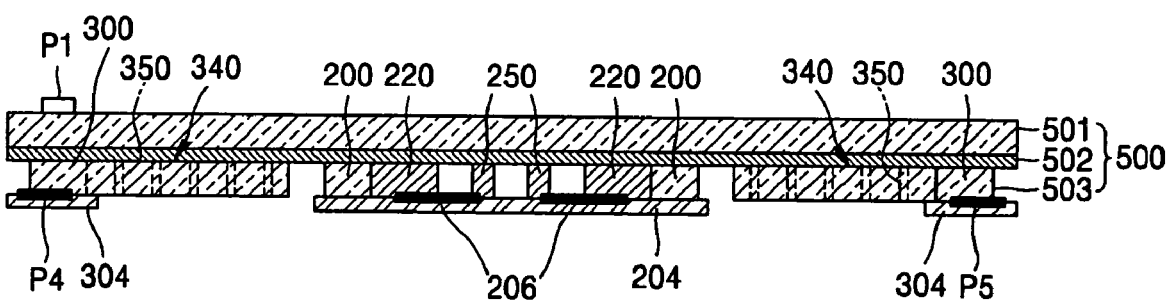

Referring to FIG. 13C, an Au/Cr film may be deposited on the first silicon layer 501 to a thickness of 4000/200 □, and then patterned to form an electrode pad P1.

Figure 13D:
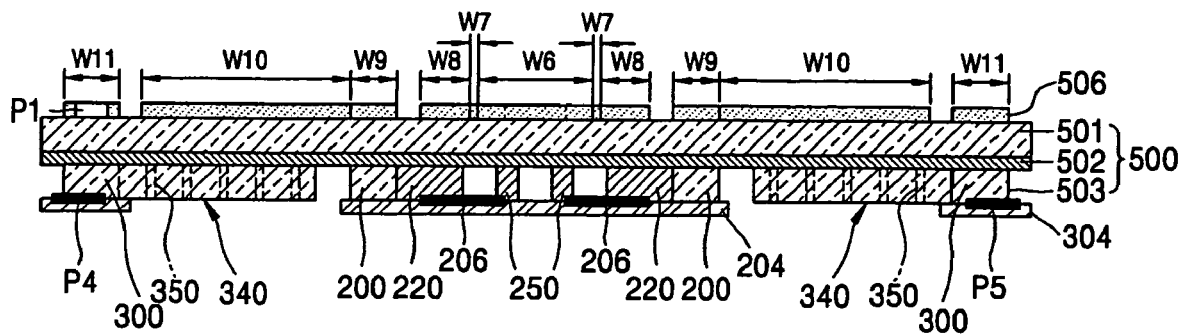

Referring to FIG. 13D, a photoresist mask 506 having a predetermined shape may be formed on the first silicon layer 501. Here, portions covered by the mask 506 may be a stage portion W6, a connecting part portion W7, a first driving comb electrode portion W8, a moving frame portion W9, a first extending member portion W10, a fixed frame portion W11, and second and third driving comb electrode portions (not shown).

Figure 13E:
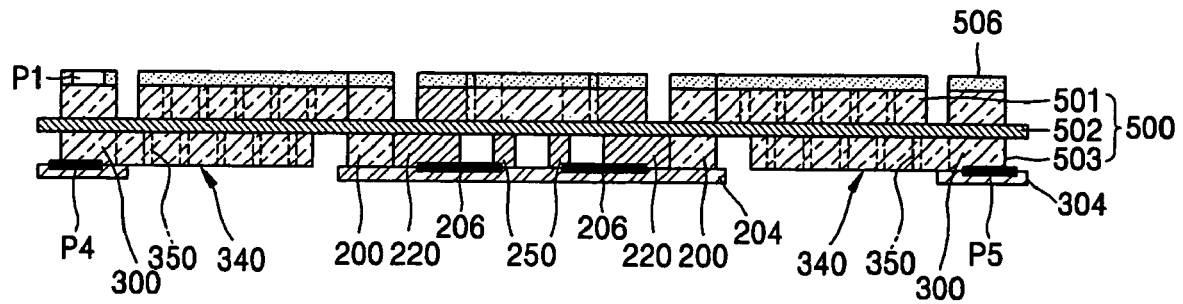

Referring to FIG. 13E, portions on the first silicon layer 501, which are not covered by the mask 506, may be etched by ICPRIE to expose the insulation layer 502 through exposed areas of the mask 506.

Figure 13F:
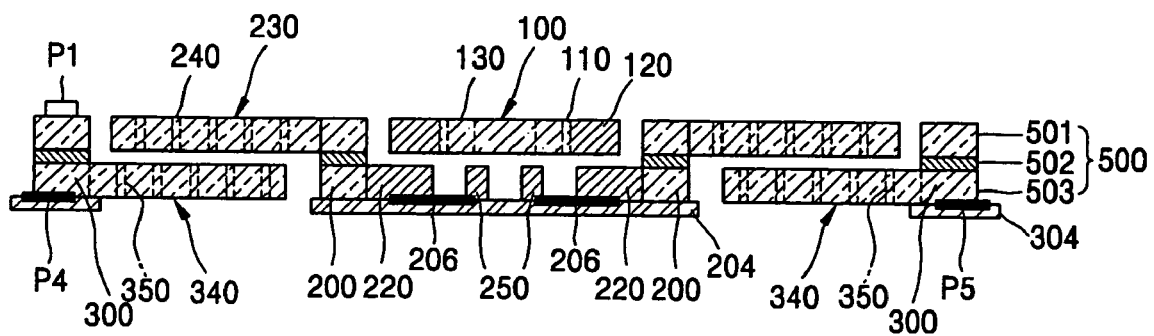

Referring to FIGS. 13F, the insulation layer 502 exposed by the mask 506 may be removed. Then, the mask 506 may be removed. A stage 100, a connecting part 110, first driving comb electrodes 120, the moving frame 200, first extending members 230, a fixed frame 300, second and third driving comb electrodes 240 and 130 may be formed.

Next, if the actuator is used as an optical scanner, a reflective layer (not shown) having a reflexibility of 99% or more may be formed on a top surface of the stage 100 to minimize a damage due to laser beams.

Although the method of manufacturing the actuator of the first embodiment has been explained, since methods of manufacturing the actuators of the second and the third embodiments can be performed according to the fourth embodiment, a detailed explanation thereof will not be given.

As described above, the actuator according to the present invention may seesaw in two directions, and may include the stage unit driving unit that drives the stage in a resonant manner in the first direction and the first support unit driving unit that drives the first support unit in a non-resonant linear manner in the second direction. Therefore, the biaxial actuator may be used as an optical scanner for a display that requires a high speed horizontal scanning and a linear vertical scanning.

In the meantime, the method of manufacturing the actuator according to the present invention electrically separate the torsion springs used in the vertical scanning as double lines, such that an upper line can be used as an electrical path for the driving comb electrodes and a lower line can be used as an electrical path for the fixed comb electrodes. Furthermore, since the driving comb electrodes and the fixed comb electrodes may be formed at different levels, the biaxial actuator may be easily manufactured, thereby reducing manufacturing costs.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A biaxial actuator comprising:
   a stage unit seesawing in a first direction;
   a first support unit supporting the stage unit;
   a stage unit driving unit including first driving comb electrodes outwardly extending from opposite sides of the stage unit in the first direction, and first fixed comb electrodes extending from the first support unit facing the first driving comb electrodes such that the first driving and fixed comb electrodes alternate with each other;
   a second support unit supporting the first support unit such that the first support unit seesaws in a second direction perpendicular to the first direction; and
   a first support unit driving unit including second driving comb electrodes installed at the first support unit, and second fixed comb electrodes corresponding to the second driving comb electrodes,
   wherein the first and second driving comb electrodes and the stage unit are formed at a first level, and the first and second fixed comb electrodes are formed at a second level lower than the first level such that the first and second fixed comb electrodes do not overlap with the first and second driving comb electrodes at a vertical plane, and
   wherein the stage unit comprises:
   a connecting part of which the first driving comb electrodes are formed at an outer surface; and
   a stage formed at an inner surface of the connecting part.

2. The biaxial actuator of claim 1, wherein the stage is a circular plate.

3. The biaxial actuator of claim 2, wherein the connecting part is an oval band having the inner surface to which the stage is connected.

4. The biaxial actuator of claim 1, wherein the first support unit comprises:
   a pair of first torsion springs extending from opposite sides of the stage unit in the second direction; and a rectangular moving frame including a pair of first portions parallel to each other and to which the first torsion springs are connected, and a pair of second portions parallel to each other and extending in the second direction, wherein the rectangular moving frame is made up of a first silicon layer to which the first torsion springs are connected, a second silicon layer to which the first fixed comb electrode is connected, and an insulation layer between the first silicon layer and the second silicon layer.

5. The biaxial actuator of claim 4, wherein the second support unit comprises:

a pair of second torsion springs extending from the second portions of the first support unit in the first direction; and a rectangular fixed frame including a pair of second portions parallel to each other to which the second torsion springs are connected, and a pair of first portions parallel to each other extending in the first direction, wherein each of the fixed frame and the second torsion springs is made up of the first silicon layer, the second silicon layer, and the insulation layer.

6. The biaxial actuator of claim 5, wherein the first support unit driving unit comprises first extending members extending from the first level of the moving frame parallel to the second torsion springs, wherein the second driving comb electrodes extend from the first extending members towards the first portions of the second support unit that face the first extending members, wherein the second fixed comb electrodes extend from second extending members that extend from the second silicon layer of the second support unit to correspond to the first extending members.

7. The biaxial actuator of claim 5, wherein the first and second driving comb electrodes are electrically connected to each other via the first silicon layer of the second torsion springs, the second silicon layer of the fixed frame has four electrically isolated portions such that voltage is separately applied to drive the stage unit in the first direction and in the second direction, and the second silicon layer of the moving frame has two electrically isolated portions such that voltage is separately applied from the second silicon layer of the second torsion springs.

8. The biaxial actuator of claim 7, further comprising:
third driving comb electrodes formed at the inner surface of the connecting part of the stage unit;
a base formed under the first support unit; and
third fixed comb electrodes formed on the base to correspond to the third driving comb electrodes.

9. The biaxial actuator of claim 8, further comprising a conductive layer formed on the base to electrically connect the corresponding first fixed comb electrodes and third fixed comb electrodes.

10. The biaxial actuator of claim 5, wherein the stage unit, the stage unit driving unit, the first support unit, the second support unit, and the first support unit driving unit are manufactured as one silicon-on-insulator (SOI) substrate.

11. The biaxial actuator of claim 1, wherein the first torsion springs are meander springs.

12. A biaxial actuator comprising:
a stage unit seesawing in a first direction;
a first support unit supporting the stage unit;
a stage unit driving unit including first driving comb electrodes outwardly extending from opposite sides of the stage unit in the first direction, and first fixed comb electrodes extending from the first support unit facing the first driving comb electrodes such that the first driving and fixed comb electrodes alternate with each other;
a second support unit supporting the first support unit such that the first support unit seesaws in a second direction perpendicular to the first direction; and
a first support unit driving unit including second driving comb electrodes installed at the first support unit, and second fixed comb electrodes corresponding to the second driving comb electrodes, wherein the first and second driving comb electrodes and the stage unit are formed at a first level, the first and second fixed comb electrodes are formed at a second level lower than the first level and at a third level higher than the first level such that the first and second fixed comb electrodes do not overlap with the first and second driving comb electrodes at a vertical plane, and wherein the stage unit comprises:
a connecting part of which the first driving comb electrodes are formed at an outer surface; and
a stage formed at an inner surface of the connecting part.

13. The biaxial actuator of claim 12, wherein the stage is a circular plate.

14. The biaxial actuator of claim 13, wherein the connecting part is an oval band having the inner surface to which the stage is connected.

15. The biaxial actuator of claim 12, wherein the first support unit comprises:
a pair of first torsion springs extending from opposite sides of the stage unit in the second direction; and
a rectangular moving frame including a pair of first portions parallel to each other and to which the first torsion springs are connected, and a pair of second portions parallel to each other and extending in the second direction, wherein the rectangular moving frame is made up of a first silicon layer to which the first torsion springs are connected, second and third silicon layers to which the first fixed comb electrodes are connected on the second level and the third level, respectively, a first insulation layer between the first silicon layer and the second silicon layer, and a second insulation layer between the first silicon layer and the third silicon layer.

16. The biaxial actuator of claim 15, wherein the second support unit comprises:
a pair of second torsion springs extending from the second portions of the first support unit in the first direction; and
a rectangular fixed frame including a pair of second portions parallel to each other to which the second torsion springs are connected, and a pair of first portions parallel to each other extending in the first direction, wherein each of the fixed frame and the second torsion springs is made up of the first silicon layer, the second silicon layer, the third silicon layer, and the first and second insulation layers.

17. The biaxial actuator of claim 16, wherein the first support unit driving unit comprises first extending members extending from the first level of the moving frame parallel to the second torsion springs, wherein the second driving comb electrodes extend from the first extending members towards the first portions of the second support unit that face the first extending members, wherein the second fixed comb electrodes extend from second extending members that respectively extend from the second silicon layer and the third silicon layer of the second support unit to correspond to the first extending members.

18. The biaxial actuator of claim 16, wherein the first and second driving comb electrodes are electrically connected to each other via the first silicon layer of the second torsion springs, the second silicon layer and the third silicon layer of the fixed frame have four electrically isolated portions such that voltage is separately applied to drive the stage unit in the first direction and the second direction, and the second silicon layer and the third silicon layer of the moving frame respectively have two electrically isolated portions such that voltage is separately applied from the second and third silicon layers of the second torsion springs.

19. The biaxial actuator of claim 18, further comprising:
    third driving comb electrodes formed at the inner surface of the connecting part of the stage unit;
    a first base formed under the first support unit; and
    third fixed comb electrodes formed on the first base to correspond to the third driving comb electrodes.

20. The biaxial actuator of claim 19, further comprising a conductive layer formed on the first base to electrically connect the corresponding first fixed comb electrodes and third fixed comb electrodes.

21. The biaxial actuator of claim 18, further comprising:
    third driving comb electrodes formed at an inner surface of the connecting part;
    a second base formed over the first support unit; and
    third fixed comb electrodes formed under the second base to correspond to the third driving comb electrodes.

22. The biaxial actuator of claim 21, further comprising a conductive layer formed under the second base to electrically connect the corresponding first fixed comb electrodes and third fixed comb electrodes.

23. The biaxial actuator of claim 16, wherein the stage unit, the stage unit driving unit, the first support unit, the second support unit, and the first support unit driving unit are manufactured as one SOI substrate.

24. The biaxial actuator of claim 12, wherein the first torsion springs are meander springs.

* * * * *